United States Patent [19]

Ely et al.

[11] Patent Number: 4,779,823

[45] Date of Patent: Oct. 25, 1988

[54] PNEUMATIC DEICER

[75] Inventors: Duain N. Ely, Uniontown; Joseph H. Macarchenia, Tallmadge, both of Ohio

[73] Assignee: The B. F. Goodrich Company, Akron, Ohio

[21] Appl. No.: 929,682

[22] Filed: Nov. 12, 1986

Related U.S. Application Data

[63] Continuation of Ser. No. 677,273, Dec. 3, 1984, abandoned.

[51] Int. Cl.$^4$ ............................................. B64D 15/18
[52] U.S. Cl. ................................................ 244/134 A
[58] Field of Search ........................................ 244/134

[56] References Cited

U.S. PATENT DOCUMENTS

| | | | |
|---|---|---|---|
| 2,375,146 | 5/1945 | Taylor | 244/134 A |
| 2,393,635 | 1/1946 | Hubbard | 244/134 A |
| 2,438,693 | 3/1948 | Campbell | 244/134 A |
| 2,440,240 | 4/1948 | Antonson | 244/134 A |
| 2,623,533 | 12/1952 | Spicer | 244/134 A |
| 4,508,295 | 4/1985 | Cattaneo et al. | 244/134 A |

Primary Examiner—Galen Barefoot
Attorney, Agent, or Firm—Joseph Januszkiewicz

[57] ABSTRACT

A deicer pad for use on an airfoil wherein the airfoil has a leading edge and a stagnation line. The deicer pad is constructed to have an intermediate portion or region and two spaced apart portions or regions and with inflatable passageways only located on or within the two spaced apart portions. The pad is mounted on the airfoil so that the intermediate portion which is non-extensible or non-stretchable overlies the leading edge and the stagnation line of the airfoil. The stagnation line is generally parallel to the leading edge of the airfoil. The passageways in the two spaced apart portions of the deicer are inflatable either simultaneously or in seriatim order and effect the breaking up of the ice over the entire deicer. The inflatable passageways are the sole means for deicing.

12 Claims, 2 Drawing Sheets

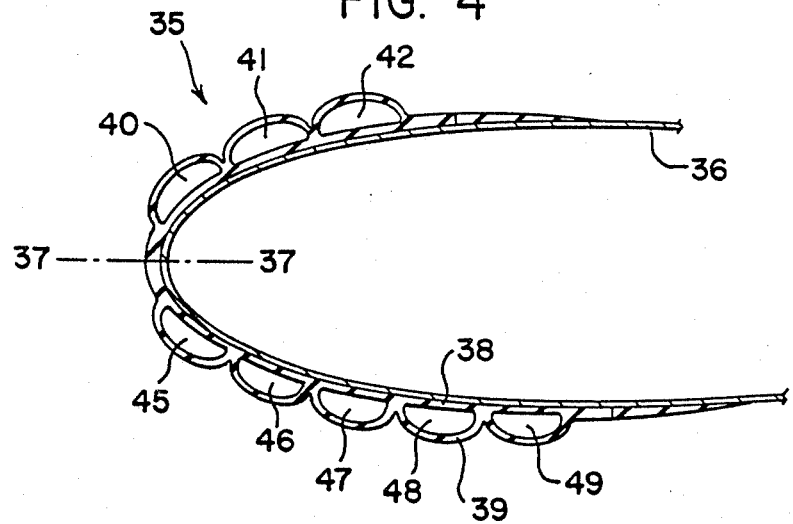

PNEUMATIC DEICER

This application is a continuation-in-part of patent application Ser. No. 677,273 filed on Dec. 3, 1984, now abandoned.

BACKGROUND OF THE INVENTION

This invention relates to aircraft deicers and more particularly to an improved inflatable deicer or boot adapted for attachment to the airfoil of an aircraft for use in retarding the accumulation of ice or to remove or break up ice accumulation.

Aircraft inflatable deicers, pads or boots are made of resilient material such as rubber and attached to the leading edge of an airfoil and extend rearwardly therefrom. The deicer has a series of inflatable passages or tubes which are distended by inflation pressure to break up ice accumulation which tends to form on the surface of the deicer. The passages or tubes are deflated by releasing the pressure medium and drawing a vacuum thereon. The normal sequence of operation is a continuous cycling of the inflation and deflation process. The present invention is an improvement on the structure and operation of prior deicers wherein the invention recognizes the need to differentiate between the stagnation line and the leading edge of an airfoil. The stagnation line of the wing of an aircraft is the line along which the air separates above and below such line on the wing whereas the leading edge of the wing is the foreward most edge of the wing. In the case of a symmetrical wing, the leading edge and the stagnation line are the same; however, in the case of a non-symmetrical or asymmetrical wing, the stagnation line is either below or above the leading edge of the wing. The present invention locates the deicer's inflatable tubes above and below the stagnation line while leaving the area immediately adjacent the stagnation line free of inflatable tubes. The advantage of this construction is a clamshell effect which takes place on the ice when the inflatable tubes on each side of the stagnation line inflate causing the ice to break in the non-inflatable area around the stagnation line. The wind stream over the airfoil then removes the ice build-up from the airfoil's leading edge. On some asymmetrical airfoils wherein the deicer is constructed in a conventional manner so that the inflatable tubes are also located on or immediately adjacent the stagnation line, the ice is not broken because the inflation tube pushes the ice cap forwardly before it breaks. The ice cap is then held onto the airfoil by the airstream. This in effect does not take advantage of the clamshell type of breaking which is so effective in a symmetrical as well as a non-symmetrical type of airfoil construction. The method of de-icing the airfoil can be improved by use of a deicer as described above, employing inflatable tubes on opposite side of the stagnation line by first inflating all of the tubes, the first set, on one side of the stagnation line and thence deflating such first set of tubes and simultaneously inflating all of the tubes, the second set, on the other side of the stagnation line, and thence repeating this cycle. The above construction of the deicer is particularly economical and effective in its deicing operation while requiring a minimum of power consumption.

SUMMARY OF THE INVENTION

The present invention is directed to a deicer pad or boot that is mounted on the forwardly disposed edge of an airfoil. Such deicer pad has the intermediate portion along the stagnation line devoid of inflatable tubes but two spaced apart portions above and below this intermediate portion which are inflated sequentially or simultaneously to effectively deice the airfoil.

BRIEF DESCRIPTION OF THE DRAWINGS

FIG. 4 is a cross-sectional view of a portion of the deicer or deicer boot mounted on a symmetrical airfoil with all of the inflation tubes or passageways in distended condition.

DETAILED DESCRIPTION

Figure 1:
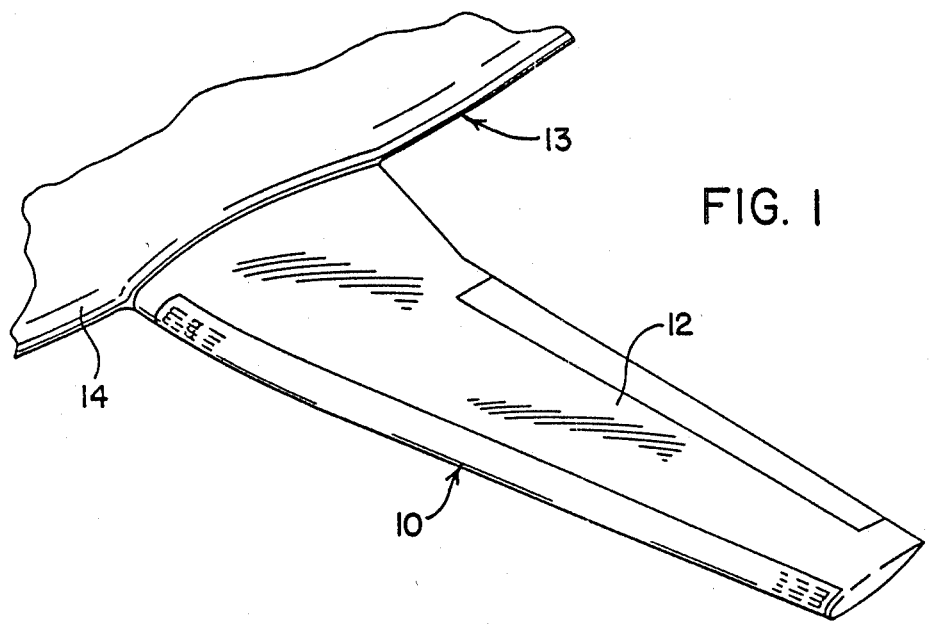
FIG. 1 is a perspective view of a portion of an airplane with a pneumatic deicer mounted upon the leading edge of the wing.
Figure 2:
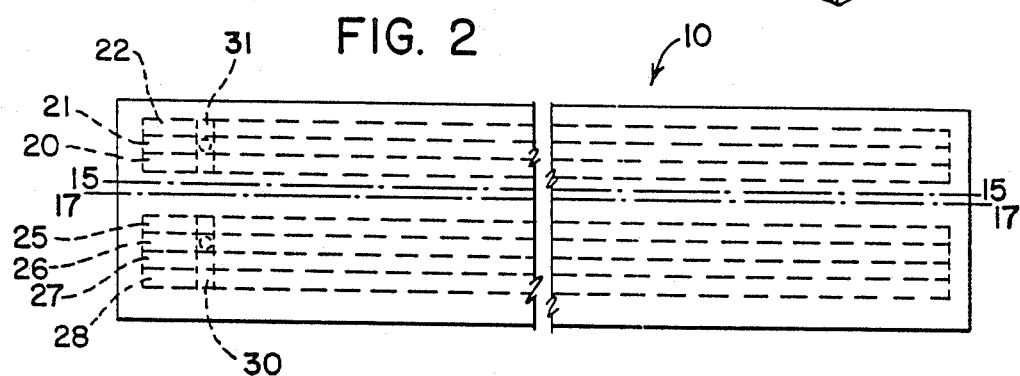
FIG. 2 is a plan view of a deicer boot with the position of the inflation passageways being shown in dotted lines.
Figure 3:
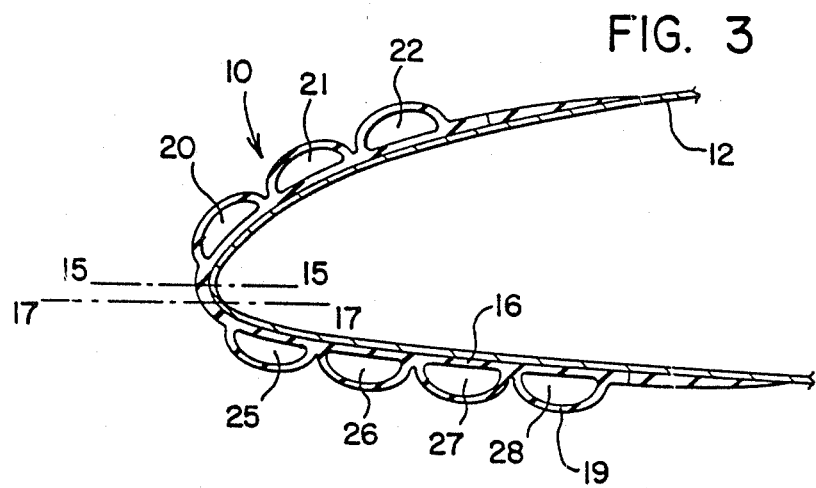
FIG. 3 is a cross-sectional view of a portion of the deicer or deicer boot mounted on an asymmetrical airfoil with the inflation tubes or passageways in distended condition.

Referring to the drawings wherein like reference numerals designate like or corresponding parts throughout the several views, there is shown in FIGS. 1 and 2 a deicer boot or pad 10 mounted on the leading edge of a wing 12 of an aircraft 13, only partial shown. The wing 12 is attached to the fuselage 14 of such aircraft 13. Although the invention is described with respect to a wing 12, it is equally applicable to a tail section or an airfoil of an aircraft The deicer pad 10, shown in FIGS. 2 and 3, is mounted on a non-symmetrical wing 12 and extends rearwardly from the leading edge 15—15 over a portion of the upper and lower surface portions of the wing 12. The deicer pad 10 is a laminated structure having an inner ply 16 (FIG. 3) that is essentially a rectangular section of rubber or other resilient rubber-like material that tapers as the other layers to be described at the respective side edges to facilitate the installation on the wing 12 as by cementing it to the airfoil and thereby not interfering with the aerodynamic effects of the wing design. In lieu of tapering the plies, the plies can have rectangular sides that fit snugly into recessed portions on the wing and similarly cemented to the airfoil. Such deicer pad 10 and ply 16 have a stagnation line 17—17 spaced from the leading edge 15—15. Such stagnation line is the line along which the air separates above and below the wing and in the example shown is generally parallel to the leading edge of the wing. Such ply 16 may be a woven textile fabric which is suitably coated with a suitable rubber compound to make this ply 16 air impervious. The inside of the plies forming the passageways to be described may have a heavy nap to facilitate the flow of air thereabove. Such nap or fibers collectively prevent complete closure and direct contact between opposing internal surfaces of the passageways to be described when the deicer pad is deflated, but have interstices through which residual air in the Passageways may be vented or pumped as by a vacuum. By such uniform distribution of nap or fibers, the external surface of the deicer pad is smooth and regular when the passageways are deflated and flattened. The terms spanwise and chordwise are used herein to designate the general direction of the passageways within the deicer pad as orientated on the aircraft's wing. Spanwise is in a direction generally parallel to the leading edge or the stagnation line of the aircraft's wing while chordwise is along a line extending transversely from the leading edge or stagnation line of the airfoil to the trailing edge of the airfoil. A ply 19 (FIG. 3) of tricot fabric overlays ply 16 and is adhered to the central portion of such ply 16 including along the leading edge 15—15 and stagnation line 17—17. The plies 16 and 19 are then adhered or bonded along the outer edge portions to form a unitary deicer.

Using the stagnation line 17—17 as a basis, three parallel spanwise passageways 20, 21 and 22 are formed by stitching the plies 16 and 19 together along parallel lines or by suitably bonding such plies along parallel lines to form such passageways which are distendable. In lieu of stitching or bonding such plies to form such passageways, separate tubes may be used. The inside of ply 19 may be napped as ply 16 to facilitate the flow of air to and from such passageways 20, 21 and 22.

That portion of the deicer pad that lies below the stagnation line 17—17 has four parallel spanwise passageways 25, 26, 27 and 28 formed by stitching the plies 16 and 19 together along parallel lines or by suitably bonding such plies along such parallel lines to form such passageways which are distendable in contrast to the non-distendable intermediate portion. In lieu of forming such Passageways 25 through 28 by stitching or bonding, separate inflatable tubes may be used. Such stitched spanwise passageways are sealed and together with passageways 20, 21 and 22 are pressurized and evacuated by separate manifolds 30 and 31, respectively. As seen in FIG. 2, the manifolds are located closely adjacent the outer extremity of the deicer pad. Each manifold 30 and 31 may be provided with an interior napped surface as with short flexible fibers of uniform thickness to prevent complete closure. To inflate the manifolds 30 and 31 and their corresponding passageways 20 through 22 and 25 through 28 suitable conduits are connected thereto and to a suitable air pressure source and a suitable vacuum source.

Those passageways 20 through 22 located above the stagnation line 17—17 define a first set of inflatable passageways in the upper deicer portion and those passageways 25 through 28 located below the stagnation line 17—17 define a second set of inflatable passageways in the lower deicer portion. The area of the deicer immediately below and above the stagnation line 17—17 is completely void of inflatable tubes or passageways and defines an intermediate portion. Thus there are three separate and distinct portions, areas or sections of the deicer, the central intermediate portion, the upper portion and the lower portion as depicted by FIG. 3. Each of these separate portions may be considered a region wherein a region is defined as one of the major subdivisions into which the entire body is divided into and thus the intermediate portion is the central or intermediate region devoid of inflatable tubes and is non-extensible with the upper extensible region having inflatable passageway 20, 21 and 22 and with the lower extensible region having inflatable passageways 25 through 28. In the example shown in FIGS. 2 and 3, the linear distance along the deicer from the stagnation line to where the first portion of passageway 25 is located is approximately one-half (½) inch; while the linear distance along the deicer from the stagnation line to where the first portion of passageway 25 is located is approximately one-half (½) inch. These dimensions will vary in accordance with the size of the wing and type of wing and can be much greater in magnitude.

A modification of the described invention is shown in FIG. 4 wherein a deicer pad 35 is shown as mounted on a symmetrical airfoil 36 having a stagnation line 37—37 coincident with leading edge. The deicer pad 35 is a laminated structure substantially as described in the first embodiment having an inner ply 38 that is essentially a rectangular section of rubber or other resilient rubber-like material that tapers as the other layers to be described at the respective side edges to facilitate the installation on the airfoil 36. In lieu of tapering the plies, the plies can have rectangular sides that fit snugly into recessed portions on the airfoil. Such ply 38 may be a woven textile fabric which is coated with a suitable rubber compound to make such ply air impervious. A ply 39 of tricot fabric overlays ply 38 and is adhered to airfoil 36 above and below the stagnation line an equal distance as shown in FIG. 4. The plies 38 and 39 are then adhered, bonded or stitched along the upper portion forming three parallel spanwise passageways 40, 41 and 42 as in the first embodiment. Separate tubes may be used to form these Passageways.

That portion of the deicer pad below the stagnation line 37—37 has five parallel spanwise passageways 45, 46, 47, 48 and 49 formed by stitching the plies 38 and 39 together along parallel lines or by suitably bonding such plies along such parallel lines to form such passageways. Passageways 40 through 42, and 45 through 49 are pressurized and deflated via suitable manifolds as described in the first embodiment. The passageways 40 through 42 located above the stagnation line 37—37 define the first set of inflatable passageways which is the upper extensible portion or region of the deicer pad, while passageways 45 through 49 define the second set of passageways which is the lower extensible portion or region of the deicer pad. Located between the upper and lower extensible portions is the intermediate non-stretchable or non-extensible portion or region of the deicer pad. The distance above and below the stagnation line 37—37 to the passageways 40 and 45 are equal and are void of inflatable passageways and is non-extensible or non-stretchable upon inflation of passageways 40 through 42 and 45 through 49. The respective inner surfaces of plies 38 and 39 may be napped as with short flexible fibers of uniform thickness to prevent complete closure of the passageways. The number of passageways above or beyond the stagnation line in each example may be varied and the number used in the examples above are only illustrative of the invention in a specific example.

The operation of the deicer pad as shown in FIG. 4 is substantially similar to the operation as described in the first embodiment with the cycling of the inflation and deflation of the passageways which distends and expands the upper and lower portions of the deicer pad effectively providing a clamshell effect in breaking up the ice on either side of the stagnation line 37—37 including that area or region to either immediate side of such stagnation line which covers the intermediate non-extensible or non-stretchable portion or region of the deicer pad.

It will be apparent that, although a specific embodiment and a modification thereof has been described, the invention is not limited to the specifically illustrated and described constructions since variations may be made without departing from the principles of the invention.

We claim:

1. A deicing apparatus for preventing the accumulation of ice upon the forwardly disposed convex portion of an airfoil having a leading edge, said apparatus having a flexible resilient sheet-like protective covering including a pair of side edges and a pair of outer edges, said outer edges adapted to be generally parallel to said leading edge of said airfoil, said covering having a smooth convex-shaped central non-extensible region overlying said leading edge and to either side of said leading edge, said central region of said covering having spaced margins lying to either side of said leading edge and parallel thereto, all of said covering of said central region being non-extensible between said spaced margins, said covering having rearward portions extending from said margins to said outer edges, a plurality of spanwise passageways lying in each of said rearward portions and extending from adjacent one of said side edges to closely adjacent the other one of said side edges, all of said passageways having side edges spaced from said non-extensible central region, said passageways lying to one side of said central non-extensible region in one of said rearward portions defines a first set of inflatable passageways, said remaining passageways in the remaining one of said rearward portions define a second set of inflatable passageways, means operatively connected to said passageways to selectively inflate and deflate said passageways, said passageways being the sole means to deice said airfoil, and all of said passageways on inflation are spaced laterally from said margins of said smooth non-extensible region.

2. A deicing apparatus as set forth in claim 1 wherein said non-extensible central region is cemented to said airfoil to prevent stretching of said non-extensible region between said margins on inflation of said passageways.

3. A deicing apparatus as set forth in claim 2 wherein said non-extensible region covers two to fifteen percent of the entire deicing apparatus surface area on said airfoil that it is mounted on.

4. A deicing apparatus as set forth in claim 2 wherein said non-extensible region covers five to ten percent of the deicing apparatus area.

5. A deicing pad mounted on an airfoil for preventing the accumulation of ice upon the forwardly disposed convex shaped portion of an airfoil, said convex shaped forward portion having a leading edge, said pad having a flexible resilient sheet-like protective covering including a pair of side edges and a pair of outer edges, said outer edges adapted to be generally parallel to the leading edge of said airfoil, said deicer pad consisting of an intermediate non-extensible portion and two spaced apart extensible portions, said spaced apart extensible portions being on either side of said intermediate portion, said airfoil having a stagnation line lying in the same direction as said leading edge but spaced laterally therefrom in a straight line horizontal flight of said airfoil, said intermediate non-extensible portion of said deicer pad overlying said leading edge and said stagnation line, each of said spaced apart portions having a plurality of spanwise passageways therein, said passageways extending from adjacent one of said side edges to closely adjacent the other one of said side edges, said passageways lying to one side of said non-extensible portion in one of said spaced apart portions define a first set of inflatable passageways, said remaining passageways lying in the other one of said spaced apart portions define a second set of inflatable passageways, means operatively connected to said passageways to selectively inflate and deflate said first set and said second set of passageways.

6. A pneumatic inflatable deicer pad for an airfoil having a leading edge, an inboard end and an outboard end; said airfoil having a stagnation line as considered on an airfoil in a straight line horizontal flight path; said deicer pad having a non-extensible intermediate portion overlying said stagnation line and said leading edge; said pad having a pair of spaced apart extensible portions spaced rearward of said non-extensible intermediate portion and said stagnation line when positioned on said airfoil; said pad having a pair of rearwardly disposed edges that are generally parallel to said stagnation line; said deicer pad having an inner ply for complete adherence to said airfoil and an upper extensible elastic ply overlying said inner ply; said upper extensible elastic ply overlying said inner ply being cemented to said inner ply to form said non-extensible intermediate portion with spaced margins; said spaced margins define the juncture of said non-extensible intermediate portion with said extensible portions, each of said rearwardly disposed spaced portions having a plurality of inflatable passageways operative upon successive distensions to distend said pad at all portions from said margins to said rearwardly disposed edges except said intermediate portion to break up ice accumulation on said deicer pad, and said passageways being the sole means to deice said airfoil.

7. A pneumatic deicer for preventing the accumulation of ice on the sharply curved and relatively less sharply curved regions of the forwardly disposed region of an airfoil including the leading edge thereon; said deicer having a covering of resilient rubber-like material for said forwardly disposed region and said leading edge; said covering having a central zone for said sharply curved region; said ventral zone having spaced margins generally parallel to said leading edge of said airfoil; said covering having rearward portions extending from said margins of said central zone for said less sharply curved regions; said entire covering of said central zone secured to said airfoil and being non-extensible between said margins; a plurality of inflatable tubes extending spanwise only in said rearward portions, and means operatively connected to said inflatable tubes to selectively inflate and deflate said tubes, and said tubes being the sole means to deice said airfoil.

8. A pneumatic deicer as set forth in claim 7 wherein said margins lie on opposite sides of said leading edge.

9. A pneumatic deicer as set forth in claim 8 wherein said central zone and said rearward portions comprise the entire deicer.

10. A pneumatic deicer as set forth in claim 9 wherein said airfoil has a stagnation line spaced from said leading edge considering a straight line horizontal flight path of said airfoil, and said leading edge and said stagnation line lying within said margins on said central zone of said covering.

11. A pneumatic deicer as set forth in claim 9 wherein said airfoil is non-symmetrical and said stagnation line is spaced below said leading edge of said airfoil on a straight line horizontal flight path.

12. A pneumatic deicer as set forth in claim 11 wherein said inflatable tubes in said spaced apart rearward portions that are nearest to said stagnation line are equidistant from said stagnation line.

* * * * *